Patented Oct. 13, 1931

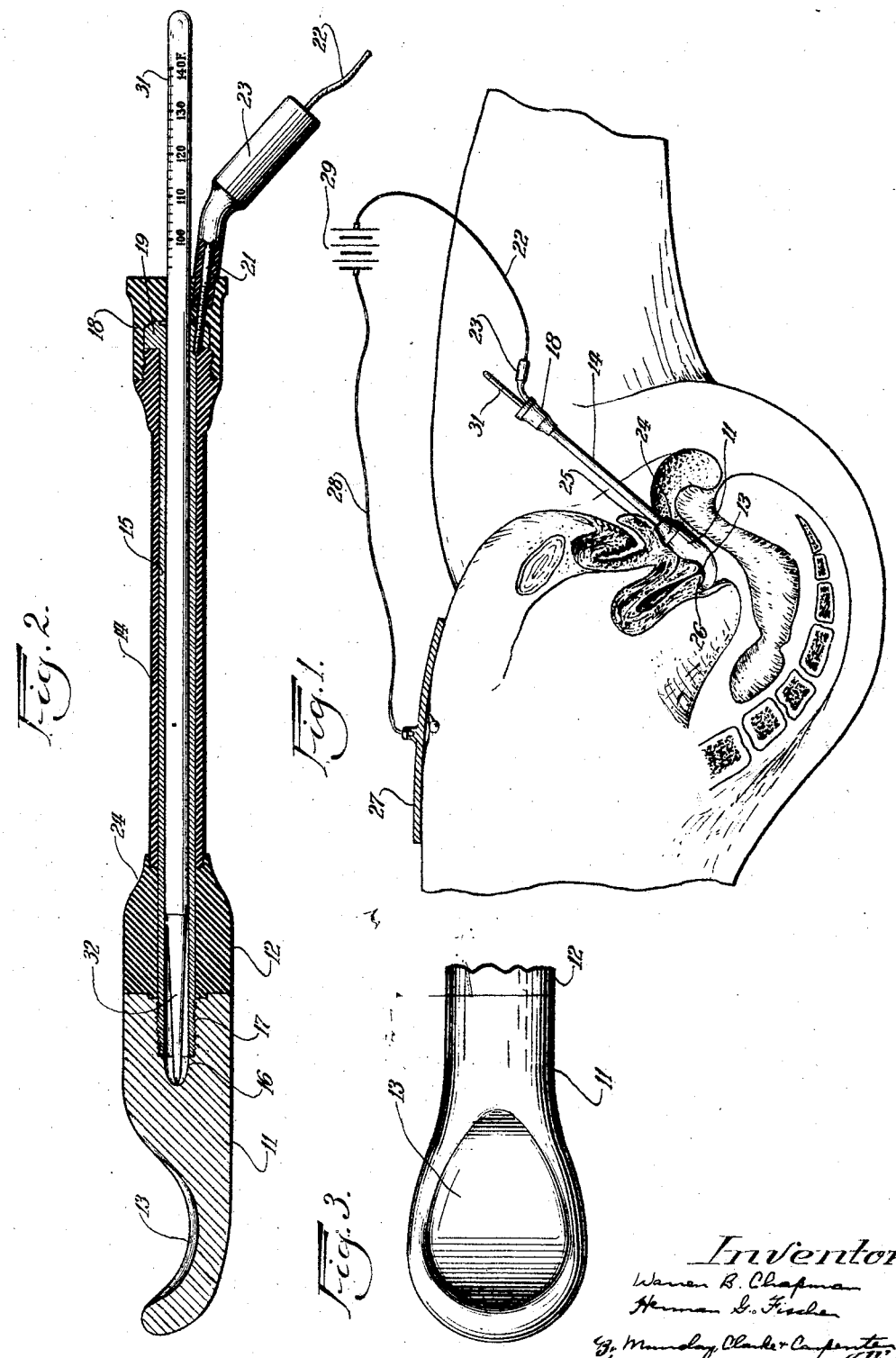

1,827,306

UNITED STATES PATENT OFFICE

WARREN B. CHAPMAN, OF CARTHAGE, MISSOURI, AND HERMAN G. FISCHER, OF CHICAGO, ILLINOIS, ASSIGNORS TO H. G. FISCHER & CO., OF CHICAGO, ILLINOIS, A CORPORATION OF ILLINOIS

ELECTRODE

Application filed September 14, 1925. Serial No. 56,255.

Our invention relates to electrotherapeutic instruments and has for its object the provision of an improved vaginal electrode having, among others, the advantages below alluded to.

An important advantage of the instrument of our invention is that it is made to conform to the contour of the vagina and thus not only renders possible more efficient treatment of the parts affected but is adapted to be held properly in place during the treatments.

The invention also provides a construction adapted to further aid in holding the instrument in place by means of an angular part or "vulval groove" over which the hymenal portion of the vagina closes after insertion of the instrument and prevents the same from falling out.

A further object of the invention is the provision of a vaginal electrode formed to provide a cervical bowl adapted to fit snugly over the cervix uteri, and, if desired, to elevate the same, thus obtaining certain desirable results in treatments not obtainable with any other type of electrode.

Another and highly important feature of the invention is the provision in an electrode of this character of a stem formed to receive a thermometer in a manner to provide temperature readings at all times during the course of the treatment, advising the physician of the temperature conditions of the inserted part of the electrode and, thereby of the results being obtained.

Numerous other objects and advantages of the invention will be apparent as it is better understood from the following description, which, taken in connection with the accompanying drawings, discloses a preferred embodiment thereof.

Referring to the drawings:

Fig. 1 is a view of the instrument placed in the vagina and showing its relation to the pelvic viscera;

Fig. 2 is a longitudinal sectional view showing the relation of the thermometer to the electrode; and Fig. 3 is a plan view of the cervical bowl of the instrument.

On said drawings we have shown for illustrative purposes only, a preferred form of the invention in which the reference character 11 indicates a non-insulated portion of a tip having an insulating part 12 joined thereto, said non-insulated portion being formed with a bowl 13 for a purpose which will presently appear and said insulating part having an insulating stem 14 extending rearwardly therefrom. Said stem and the part 12 are hollow and adapted to receive a metal tube 15 which is threaded into a socket 16 in the non-insulated portion 11 of the tip as indicated at 17 in Fig. 2. A rubber cap 18 is threaded onto the rear end of the stem 14 and receives an enlargement 19 formed on the rear end of the tube 15, this construction binding the parts together in evident manner to form a unitary device. The electrode is connected with the electric circuit by means of a contact rod 21 threaded into the enlargement 19 of the tube 15 and connected with a wire 22 which may form a part of a D'Arsonval connection. Said rod being insulated by an angularly extending insulating member 23.

The instrument is made to accurately conform to the shape of the female organs and may be introduced through the anterior opening or hymenal portion of the vagina. This is the narrowest portion of the vagina and the surrounding vulval muscles 25 offer some resistance to the introduction of the instrument. After the instrument is properly positioned, the vulval muscles contract and embrace a groove 24 formed in the insulating portion 12 of the tip to retain the electrode in position. After insertion the bowl 13 of the instrument is pushed to the extreme posterior form of the vagina and engages the cervix uteri 26, as shown in Fig. 1. The cervical bowl 13 is shaped to fit over the cervix and to be retained in position by the suction thereof. This is an important feature of the invention for all other vaginal electrodes work out of position during operation, and have to be held in place by externally applied means. An indifferent electrode 27 is applied to the abdomen and is connected electrically to a battery 29 through suitable means for circuit control.

The insulation 12 and 14 extends well within the vagina to protect the external tissues thereof from the heat of the conductor 15, making the effective internal tip temperature much higher than is possible with other types of electrode which do not insulate the external tissues from the heat of the electrode, and which consequently have to be operated at temperatures low enough to accommodate the tolerance of the external tissues. The vaginal mucosa will tolerate temperatures greatly in excess of the external skin.

The curved stem 23 when attached to the electrode stem produces a downward pull thereon that automatically elevates the uterus and brings a sagging, sub-involuted organ into its proper position, thus facilitating treatment thereof by bringing the organ closer to the indifferent electrode 27 and promoting a greater concentration of current thereon.

A thermometer 31 may be inserted through the cap 18 into the interior of the tube 15 to dispose the tip 32 thereof in the socket 16 of the electrode tip 11, so that the temperature thereof is at all times determinable. This is an important feature inasmuch as it is possible to much more accurately control the effects of the treatment and to avoid overheating and resultant burns. No thermometer has been provided in any other electrodes, and it has been necessary for the physician to treat patients according to an estimated tolerance, and concentration of heat necessary to destroy the organisms of infection. With the apparatus of applicants' invention, it is possible at all times to determine whether or not the parts are heating properly and if not, to check the technic to determine wherein the fault lies.

It is thought that the invention and many of its attendant advantages will be understood from the foregoing description, and it will be apparent that various changes may be made in the form, construction and arrangement of the parts without departing from the spirit and scope of the invention or sacrificing all its material advantages, the form hereinbefore described being merely a preferred embodiment thereof.

We claim:

1. An electrotherapeutic device comprising an electrode including a tip insertable in a body cavity, means for connecting said tip in an electric circuit, and a stem secured to said tip and adapted to be disposed outside said body cavity when the device is in use, said stem comprising a hollow tube of conducting material, means for connecting the same into the circuit, the inner end of said tube being engaged with said tip, and an insulating member in which said tube is enclosed, said tube being adapted to receive a thermometer for indicating at a visible point the temperature of the inserted tip.

2. An electrotherapeutic device, comprising an electrode including a non-insulated tip formed with a bowl to engage the cervix uteri when inserted in the vagina, an insulated stem having a shoulder thereon with which the vulval muscles engage by contraction thereabout to hold the device in place in the vagina, and means for connecting the electrode in an electric circuit.

WARREN B. CHAPMAN.
HERMAN G. FISCHER.